United States Patent [19]
Davis

[11] Patent Number: 6,101,455
[45] Date of Patent: Aug. 8, 2000

[54] AUTOMATIC CALIBRATION OF CAMERAS AND STRUCTURED LIGHT SOURCES

[76] Inventor: Michael S. Davis, 2594 Loeffler, Chelsea, Mich. 48118

[21] Appl. No.: 09/079,422

[22] Filed: May 14, 1998

Related U.S. Application Data

[60] Provisional application No. 60/046,441, May 14, 1997.

[51] Int. Cl.[7] .............................. G06F 17/00; G01B 11/00
[52] U.S. Cl. .............................. 702/94; 702/95; 702/150; 702/152; 700/245; 700/254; 382/153; 382/154
[58] Field of Search ................................ 702/94, 95, 150, 702/151, 152, 153; 901/42, 47; 700/245, 253, 254, 259, 251; 382/153, 154

[56] References Cited

U.S. PATENT DOCUMENTS

| | | | |
|---|---|---|---|
| 4,238,828 | 12/1980 | Hay et al. ............................ | 702/152 |
| 4,412,121 | 10/1983 | Kremers et al. ..................... | 901/47 |
| 4,639,878 | 1/1987 | Day et al. ........................... | 364/513 |
| 4,645,348 | 2/1987 | Dewar et al. ........................ | 356/376 |
| 4,672,562 | 6/1987 | Egli et al. ........................... | 702/152 |
| 4,675,502 | 6/1987 | Haefner et al. ..................... | 901/47 |
| 4,753,569 | 6/1988 | Pryor .................................. | 414/730 |
| 4,942,539 | 7/1990 | McGee et al. ...................... | 700/253 |
| 4,979,815 | 12/1990 | Tsikos ................................. | 356/1 |
| 5,321,353 | 6/1994 | Furness .............................. | 700/259 |
| 5,329,469 | 7/1994 | Watanabe ........................... | 364/571.01 |
| 5,513,276 | 4/1996 | Theodoracatos ................... | 382/154 |
| 5,666,202 | 9/1997 | Kyrazis .............................. | 356/375 |

OTHER PUBLICATIONS

Y. Yakimovsky, R. Cunningham; "A System for Extracting Three–Dimensional Measurement from a Stereo Pair of TV Cameras", Computer Graphics and Image Processing 7, 1987, pp. 195–210.

*Primary Examiner*—Marc S. Hoff
*Assistant Examiner*—Brian Bui
*Attorney, Agent, or Firm*—Gifford, Krass, Groh, Sprinkle, Anderson & Citkowski, PC

[57] ABSTRACT

A work cell containing robot(s), video camera(s), and structured lighting source(s) is calibrated by observing targets with the camera(s) as a robot is displaced through a set of offsets. Complete information is recovered about the camera (s) calibration data and the structure of illumination from the light source(s). The robot is utilized to create known relative movements between the targets and the camera(s) and light source(s). Therefore, this technique is applicable to both the fixed and moving camera cases. Except for the target surface profile, there is no requirement to externally determine any absolute or relative positions, or any relationships either within or between the camera(s), targets, light source(s), and robot(s). Either single or multiple cameras (acting independently or in stereo) are calibrated to the robot's coordinate frame, and then optionally used as measuring devices to determine the position and form of the structured light.

21 Claims, 5 Drawing Sheets

$$\vec{P}_1 = \vec{C} + \alpha_1 \hat{r}_1$$
$$\vec{P}_2 = \vec{C} + \alpha_2 \hat{r}_2$$

$$\alpha_1 \hat{r}_1 + \vec{T} = \alpha_2 \hat{r}_2$$

where $\alpha_1$ and $\alpha_2$ are unknown distances along the normal vectors $\hat{r}_1, \hat{r}_2$ respectively.
$\vec{T}$ is the relative translation between $\vec{P}_1$ and $\vec{P}_2$.

Fig - 4

$$\begin{Bmatrix} Pos_x & Norm_x \\ Pos_y & Norm_y \\ Pos_z & Norm_z \end{Bmatrix}_{current} = \begin{bmatrix} offset \end{bmatrix} \begin{Bmatrix} Pos_x & Norm_x \\ Pos_y & Norm_y \\ Pos_z & Norm_z \end{Bmatrix}_{nominal}$$

or $\vec{P}_1 \rightarrow \vec{P}_{n\,current}$

⎫ fit to plane for $\begin{Bmatrix} Pos_x & Norm_x \\ Pos_y & Norm_y \\ Pos_z & Norm_z \end{Bmatrix}_{current}$

AUTOMATIC CALIBRATION OF CAMERAS AND STRUCTURED LIGHT SOURCES

REFERENCE TO RELATED APPLICATIONS

This application claims priority of U.S. provisional application Ser. No. 60/046,441, filed May 14, 1997, the entire contents of which are incorporated herein by reference.

FIELD OF THE INVENTION

This invention relates generally to robotics and machine vision and, in particular, to method and apparatus for calibrating cameras and light sources within work cells associated with such applications.

BACKGROUND OF THE INVENTION

Camera calibration techniques are known in the fields of robotics and machine vision. According to one existing calibration technique for stereo camera pairs, for example, the determination of a cameras position is based upon knowledge of the absolute position of targets in three space. This procedure enables subsequent measurement through triangulation using the views from the two cameras.

Existing approaches to work-cell type calibration either mandate multiple, stereoscopic cameras or factory calibrated components. For example, U.S. Pat. No. 4,645,348, teaches a laser and a camera which are factory-calibrated or 'rectified' with respect to one another and contained within an integrated enclosure. However, although the laser and camera are calibrated with respect to one another, they are not calibrated with respect to a robot. Rather, the inventors in this case expect to supply the calibrated laser/camera combination in component form for user calibration within different application environments.

U.S. Pat. No. 4,639,878 patent uses multiple cameras, but they are independently calibrated with respect to a fixture. Given this fixture, traditional methods are used to calibrate cameras and robot end effectors through touch. In this example there is no direct calibration between the cameras and the robot.

U.S. Pat. No. 5,329,469 patent discloses a position correction arrangement, wherein cameras mounted on the end of the robot arm are moved to different locations, at which point cameras are used for viewing purposes only; that is, differences in spatial position are noted but not used to compute update information.

In U.S. Pat. No. 4,753,569, a robot holds a card exhibiting a dot pattern, which a camera views at a skewed angle in order to ascertain depth information and not absolute position. In this system, not only is information required as to the relationship among the dots, but the relationship between the dots, the card, and the robot arm, must also be determined and input in advance.

Other references require very precise alignment prior to, or during, use, thereby limiting their applicability. U.S. Pat. No. 5,513,276, for example, requires the laser and the angle of view of the camera to be parallel. U.S. Pat. No. 4,979,815 discloses the use of a laser and a camera to obtain height information. Specifically, objects under inspection are scanned to gather depth profiles, requiring the laser to be very accurately maintained normal to the surface of the observation platform. Accordingly, a gage block is inserted in the field of view which is scanned, enabling images to be calibrated relative to the gage block.

Other methods have used fixed cameras and lasers and factory calibration of the combination to provide three-dimensional measurement with respect to the set-up. This limits the available laser-camera configurations to those supplied by the factory, and provides no means for rectification of the data into a robot's coordinate frame.

SUMMARY OF THE INVENTION

This invention facilitates the automatic calibration of camera and light positions in a work-cell type environment without the need for stereo pairs of cameras or the knowledge of any external measures. Complete camera calibration with respect to a robot's coordinate frame requires only certain robot offsets and camera views. In a robust embodiment of the invention, knowledge of a target's surface shape and its displacement, along with the images of where the light beam(s) strike it, allows for the complete determination of the three-dimensional position and shape of a structured light source. The knowledge obtained through the invention provides the ability to use the camera and light source for subsequent three-dimensional measurements directly in a robot's coordinate frame.

DETAILED DESCRIPTION OF THE INVENTION

According to one embodiment of the invention, a calibration target is constructed, preferably with at least three distinct features or fiducials that can be resolved in a camera's image space. The target is affixed to the robot's end affecter and the camera(s) and light source(s) are mounted in the work cell. A series of translational offsets are then sent to the robot, which moves the target in three space while still remaining in the field of view of the camera. For each offset position of the target, the positions of the features in the image space and the offsets are recorded. This data is used to compute the camera's calibration data with respect to a temporary coordinate frame, and the three-dimensional positions of the target's feature set. This temporary coordinate frame, Fl, is aligned with the robot's frame, but its origin is preferably chosen so as to be centered on the target's first feature in the first offset position.

The robot is then displaced by a second set of offsets in which rotations are performed about each of the three axes and translations are optionally added to keep the target in the field of view. In one embodiment, at least two distinct positions are viewed for each of the target orientations. The resulting views are then used to compute the 3D positions of the features (with respect to Fl), and then the 3D positions and known offsets are used to compute the robot's frame origin. In the preferred embodiment, the known offsets and target projections are used to directly solve for Fl with respect to the robot's coordinate frame. This information is then used to update the camera's calibration data to be with respect to the robot.

In a more comprehensive configuration, a final set of offsets are used to find the shape of structured light implemented within the work cell. The target is moved over a set of positions wherein the light striking the target is in the camera's field of view. The nominal position and orientation of the target surface is computed, based upon the preceding calibration information, and this data is then transformed by the offset data to yield the target's location at each of the offset positions.

Preferably the target surface and light structure are planar, though such restraints are not required under the invention. A non-planar surface and/or point light sources may be used with appropriate modification to the methods disclosed. In the case of a plane of light and a planar target surface, the camera will image a line from where the two planes intersect. At least two positions, the 3D lines defined by these plane intersections, are computed using the camera's calibration data, the image of the intersections, and the computed positions of the target. The resulting set of 3D intersection lines is then used to find the 3D description of the plane of light.

Pinhole Camera Model

Figure 1:
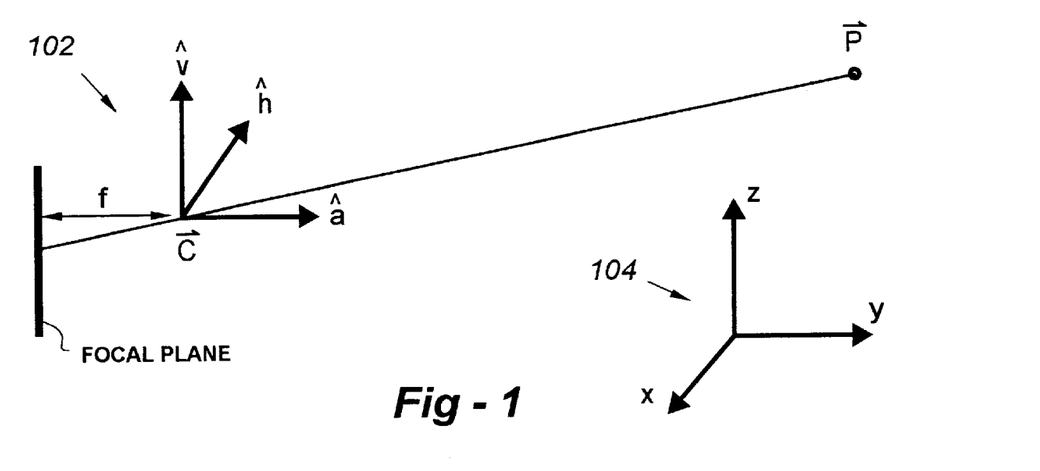
FIG. 1 is a model of a pinhole camera useful in understanding frames of reference applicable to the invention.

In helping to understand the invention, reference will now be made to FIG. 1, which illustrates a pinhole camera model 102 relative to an external, fixed coordinate frame 104. In regards to this figure:

p is an external point in space;
c is the camera's focal center;
f is the focal length of the lens; and
a, h and v represent an orthonormal set aligned to the camera.

Through similar triangles, two relationships in camera x and y (i,j) may be written as follows:

$$\frac{(\vec{P}-\vec{C})\cdot \hat{h}}{(\vec{P}-\vec{C})\cdot \hat{a}} = \frac{i-i_0}{f} \quad \frac{(\vec{P}-\vec{C})\cdot \hat{v}}{(\vec{P}-\vec{C})\cdot \hat{a}} = \frac{j-j_0}{f}$$

letting $$\vec{H} \equiv (f\hat{h} - i_0 \hat{a})$$

$$\vec{V} \equiv (f\hat{v} - j_0 \hat{a})$$

$$\frac{(\vec{P}-\vec{C})\cdot H}{(\vec{P}-\vec{C})\cdot \hat{a}} = i$$

$$i\vec{P}\cdot \hat{a} - i\vec{C}\cdot \hat{a} = \vec{P}\cdot \vec{H} - \vec{C}\cdot \vec{H}$$

$$\frac{(\vec{P}-\vec{C})\cdot \vec{V}}{(\vec{P}-\vec{C})\cdot \hat{a}} = j$$

$$j\vec{P}\cdot \hat{a} - j\vec{C}\cdot \hat{a} = \vec{P}\cdot \vec{V} - \vec{C}\cdot \vec{V}$$

letting $$CA = \vec{C}\cdot \hat{a}$$

$$CH = \vec{C}\cdot \vec{H}$$

$$CV = \vec{C}\cdot \vec{V}$$

1) $i\vec{P}\cdot \hat{a} - iCA = \vec{P}\cdot \vec{H} - CH$

2) $j\vec{P}\cdot \hat{a} - jCA = \vec{P}\cdot \vec{V} - CV$

Equations 1) and 2) hold relationship between image coordinates (ij), point coordinates ($P_x$, $P_y$, $P_z$), and camera calibration parameters ($\vec{C}$, $\vec{H}$, $\vec{V}$, a). To solve for ($\vec{C}$, $\vec{H}$, $\vec{V}$, â), we use equations 1 and 2, and observe N points ($\vec{P}_1 \rightarrow \vec{P}_N$) for the image coordinaes $(i,j)_1 \rightarrow (i,j)_N$.

For K=1 to N $$i_k \vec{p}\cdot \hat{a} - i_k CA - \vec{P}_k \cdot \vec{H} + CH = 0$$

$$j_k \vec{p}\cdot \hat{a} - j_k CA - \vec{P}_k \cdot \vec{V} + CV = 0$$

By redefining $P_k = P_k - P_1$ (move origin to 1st point) and setting CA=−1 (guaranteed non-zero by $P_k$ redefinition) in matrix form yields:

$$\begin{bmatrix} i_k P_{kx} & i_k P_{ky} & i_k P_{k3} & -P_{kx} & -P_{ky} & -P_{k3} & 0 & 0 & 0 & 1 & 0 \\ j_k P_{kx} & j_k P_{ky} & j_k P_{k3} & 0 & 0 & 0 & -P_{kx} & -P_{ky} & -P_{k3} & 0 & 1 \end{bmatrix} \begin{bmatrix} a_x \\ a_y \\ a_3 \\ H_x \\ H_y \\ H_z \\ V_x \\ V_y \\ V_z \\ CH \\ CV \end{bmatrix} = \begin{bmatrix} -i_k \\ -j_k \end{bmatrix}$$

using $[A]^T[A][X]=[A]^T[Y]$

A square matrix is formed for the (least squares best fit) solution of [X]: ($a_x, a_y, a_z, H_x, H_y, H_z, V_x, V_y, V_z,$ CH, CV) Renormalizing the solution vector such that $a_x^2 + a_y^2 + a_z^2 = 1$ and update CA by the same scaling, yields:

$\hat{a}, \vec{H}, \vec{V}$, CH, CV, CA

Upon recovering camera position vector $\vec{C}$ (with respect to redefined coordinate frame):

$$\begin{bmatrix} a_x & a_y & a_z \\ H_x & H_y & H_z \\ V_x & V_y & V_z \end{bmatrix} \begin{bmatrix} C_x \\ C_y \\ C_z \end{bmatrix} = \begin{bmatrix} CA \\ CH \\ CV \end{bmatrix}$$

This method may be used to find the (relative) camera calibration parameters for a single dot target moved known translational offsets over time, a calibration fixture containing an n dot pattern whose relative positions are known, or a multidot pattern moved over time if the center of mass is the computed image coordinate.

Recovery of $\vec{C}$ with Respect to the External Coordinate Frame (Stereo Case)

The procedure in this case is as follows:

1) Move the target through a set of m offsets that include rotations about each of the three axes. Translations may be included to keep the target within the camera's field of view. Record both the offset and image coordinates from both cameras at each of the positions.

$[Off_k] k = 1 \to m$

2) Use the cameras to triangulate the 3D position of the target at each of its offset positions. Note that this computation will be with respect to the temporary coordinate frame.

$\{P_k\} k = 1 \to m$

3) The zero offset position of the target in the external coordinate frame $\{P^*\}$, and the frame adjustment vector $\{F\}$ can then be found by solving the simultaneous equations created by the relationship:

$[off_k]\{P^*\} = \{P_k\} + \{F\}$ using $[Rot] + [T] = [off]$ $[Rot_m]\{P^*\} + \{T_m\} = \{P_m\} + \{F\}$ $$\begin{bmatrix} Rot_m & -1 & 0 & 0 \\ & 0 & -1 & 0 \\ & 0 & 0 & -1 \end{bmatrix} \begin{bmatrix} P^* \\ P_x \\ P_y \\ P_z \\ F_x \\ F_y \\ F_z \end{bmatrix} = \{P_m - T_m\}$$

Three equations are generated at each position solve for best-fit $\vec{P}^*$ and $\vec{F}$ using psuedo inverse $[A]^T[A]\{\vec{X}\} = [A]^T\{\vec{Y}\}$ 4) The zero offset position is not needed, the F vector is the difference between the temporary frame and the external coordinate frame. The camera position vector C is updated so that it is with respect to the external frame.

Multi-Fiducial Target Camera Calibration

With reference to the single-fiducial calibration to generate equations 1 & 2:

1) $i\vec{P} \cdot \hat{a} - iCA = \vec{P} \cdot \vec{H} - CH$

2) $j\vec{P} \cdot \hat{a} - jCA = \vec{P} \cdot \vec{V} - CV$

Choose one of the fiducials to be prime, and the others secondary.

The above equations hold directly for the prime fiducial.

$i^o \vec{P}^o \cdot \hat{a} - P^o \cdot \vec{H} + CH = i^o CA$ $j^o \vec{P}^o \cdot \hat{a} - P^o \cdot \vec{V} + CV = j^o CA$ The secondary fiducials will generate:

$i^n \vec{P}^o \cdot a + i^n \vec{P}^n \cdot a - \vec{P}^o \cdot \vec{H} - \vec{P}^n \cdot \vec{H} + CH = i^n CA$ $j^n \vec{P}^o \cdot a + j^n \vec{P}^n \cdot a - \vec{P}^o \cdot \vec{V} - \vec{P}^n \cdot \vec{V} + CV = j^n CA$ where ($i^n$, $j^n$) represents the image coordinates of the nth fiducial, and $p^n$ is the relative offset of the nth fiducial from the prima fiducial.

For each of the secondary fiducials we have the above two equations and three new unknowns:

$(\vec{P}^n \cdot \hat{a}), (\vec{P}^n \cdot \vec{H}), (\vec{P}^n \cdot \vec{V})$ in matrix notation:

$$\begin{bmatrix} i_k^0 P_{kx}^0 & i_k^0 P_{ky}^0 & i_k^0 P_{kz}^0 & -P_{kx}^0 & -P_{ky}^0 & -P_{kz}^0 & 0 & 0 & 0 & 1 & 0 & 0 & 0 & 0 \\ j_k^0 P_{kx}^0 & j_k^0 P_{ky}^0 & j_k^0 P_{kz}^0 & 0 & 0 & 0 & -P_{kx}^0 & -P_{ky}^0 & -P_{kz}^0 & 0 & 1 & 0 & 0 & 0 \\ i_k^n P_{kx}^0 & i_k^n P_{ky}^0 & i_k^n P_{kz}^0 & -P_{kx}^0 & -P_{ky}^0 & -P_{kz}^0 & 0 & 0 & 0 & 1 & 0 & i_k^n & -1 & 0 \\ j_k^n P_{kx}^0 & j_k^n P_{ky}^0 & j_k^n P_{kz}^0 & 0 & 0 & 0 & -P_{kx}^0 & -P_{ky}^0 & -P_{kz}^0 & 0 & 1 & j_k^n & 0 & -1 \end{bmatrix} \begin{bmatrix} A_x \\ A_y \\ A_z \\ H_x \\ H_y \\ H_z \\ V_x \\ V_y \\ V_z \\ CH \\ CV \\ PA^n \\ PH^n \\ PV^n \end{bmatrix} = \begin{bmatrix} i_k^0 CA \\ j_k^0 CA \\ i_k^n CA \\ j_k^n CA \end{bmatrix}$$

For each additional fiducial, Repeat lines 2 & 3 and extend the superscript "n" sequences.

As before, setting CA=−1 and redefining the offsets to be relative to the 1st position allows the least squares best-fit solution to be found for the unknown vector:

$(\vec{a}, \vec{H}, \vec{V}, CH, CV, PA^n, PH^n, PV^n)$ renormalizinq a and scaling the remainder of the vector gives $(\vec{a}, \vec{H}, \vec{V})$ of the calibration data.

Solving:

$$\begin{bmatrix} a_x & a_y & a_3 \\ H_x & H_y & H_z \\ V_x & V_y & V_z \end{bmatrix} \begin{bmatrix} C_x \\ C_y \\ C_z \end{bmatrix} = \begin{bmatrix} CA \\ CH \\ CV \end{bmatrix}$$

recovers $\vec{C}$ with respect to the prime fiducial at the first offset position. Similarly, for each secondary fiducial, the equation:

$$\begin{bmatrix} a_x & a_y & a_z \\ H_x & H_y & H_z \\ V_x & V_y & V_z \end{bmatrix} \begin{bmatrix} P_x^n \\ P_y^n \\ P_z^n \end{bmatrix} = \begin{bmatrix} PA^n \\ PH^n \\ PV^n \end{bmatrix}$$

allows the recovery of the secondary fiducial positions in the targets first offset position.

3D Position Measurement (Stereo Cameras)

Figure 2:
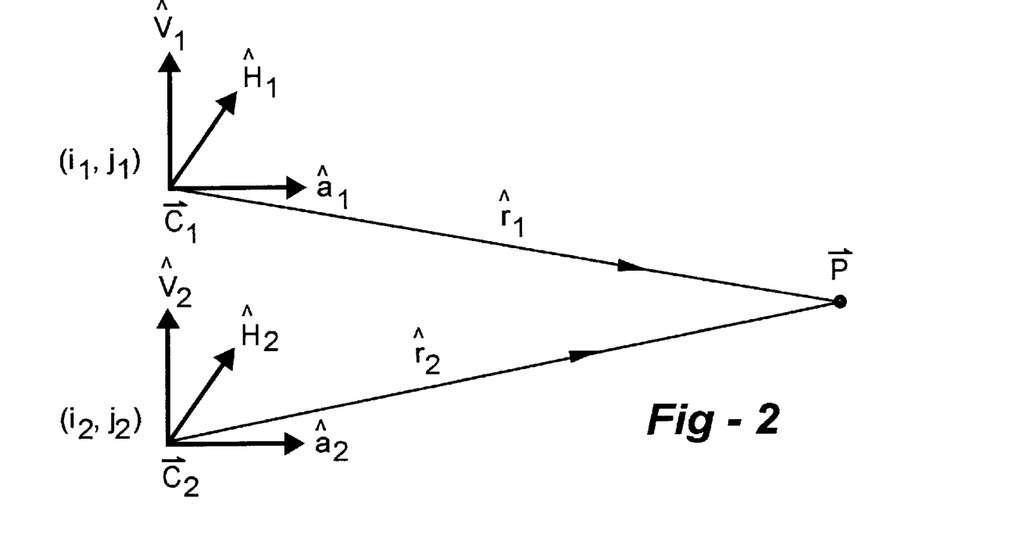
FIG. 2 is a schematic representative of a three-dimensional position measurement system based upon stereo cameras and triangulation.

Given that the cameras have already been calibrated to a common coordinate frame and their calibration vectors are known, a triangulation method allows recovery of the position of an object viewed from both cameras, as shown in FIG. 2.

From the calibration derivation:

$$i = \frac{(P-C) \cdot H}{(P-C) \cdot \hat{a}} \qquad j = \frac{(P-C) \cdot V}{(P-C) \cdot \hat{a}}$$

$$(P-C_1) \cdot (i_1 \hat{a}_1 - \vec{H}_1) = 0 \qquad (P-C_1) \cdot (j_1 \hat{a}_1 - \vec{V}_1) = 0$$

the vector (P−$C_1$) is perpendicular to both (dot product=∅), so its direction can be recovered through a cross product.

$\vec{r}_1 = (i_1 \hat{a}_1 - \vec{H}_1) \hat{\times} (j_1 \hat{a}_1 - \vec{V}_1)$ Similarly, $\vec{r}_2 = (i_2 \hat{a}_2 - \vec{H}_2) \cdots (j_2 \hat{a}_2 - \vec{V}_2)$ The vector equation can then be formed relating the unknown point P with the two cameras centers and the ray directions from each of the cameras.

$\vec{P} = \vec{C}_1 + \alpha_1 \hat{r}_1$ $\vec{P} = \vec{C}_2 + \alpha_2 \hat{r}_2$ $(\vec{C}_1 - \vec{C}_2) = -\alpha_1 \hat{r}_1 + \alpha_2 \hat{r}_2$ Solving for either $\alpha_1$ or $\alpha_2$ gives the distance along A A respectively $\hat{r}_1$ or $\hat{r}_2$ from the camera to the unknown point P.

$$\begin{bmatrix} -r_{1x} & -r_{2x} \\ -r_{1y} & -r_{2y} \\ -r_{1z} & -r_{2z} \end{bmatrix} \begin{bmatrix} \alpha_1 \\ \alpha_2 \end{bmatrix} = \begin{bmatrix} C_{1x} - C_{2x} \\ C_{1y} - C_{2y} \\ C_{1z} - C_{2z} \end{bmatrix}$$

$$\begin{bmatrix} 1 & -\hat{r}_1 \cdot \hat{r}_2 \\ -\hat{r}_1 \cdot \hat{r}_2 & 1 \end{bmatrix} \begin{bmatrix} \alpha_1 \\ \alpha_2 \end{bmatrix} = \begin{bmatrix} -\hat{r}_1 \cdot (C_1 - C_2) \\ -\hat{r}_2 \cdot (C_1 - C_2) \end{bmatrix}$$

3D Position Measurement (Single Camera)

Figure 3:
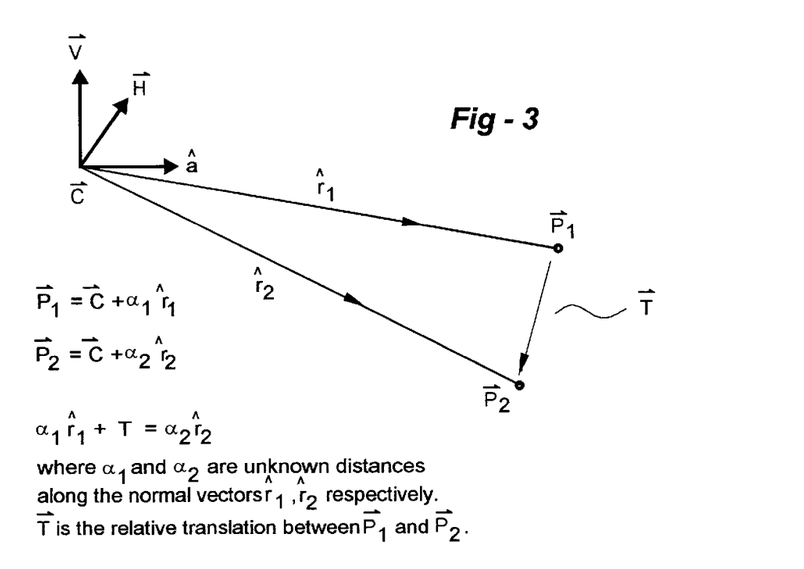
FIG. 3 is a schematic drawing which relates to three-dimensional position measurement for a single camera, showing how positions may be determined according to the invention using vector relationships.

Given a calibrated camera and an object moved a known relative distance, the positions can be found using the vector relationships shown in FIG. 3.

From the calibration data and image coordinates of the viewed object, the rays $\hat{r}_1$ and $\hat{r}_2$ can be found.

$\vec{r}_1 = (i_1 \hat{a} - \vec{H}) \otimes (j_1 \hat{a} - \vec{V})$ $\vec{r}_2 = (i_2 \hat{a} - \vec{H}) \otimes (j_2 \hat{a} - \vec{V})$ $r = \frac{\vec{r}}{\|\vec{r}\|}$ $\vec{T} = \alpha_2 \hat{r}_2 - \alpha_1 \hat{r}_1$ $$\begin{bmatrix} -r_{1x} & r_{2x} \\ -r_{1y} & r_{2y} \\ -r_{1z} & r_{2z} \end{bmatrix} \begin{bmatrix} \alpha_1 \\ \alpha_2 \end{bmatrix} = \begin{bmatrix} T_x \\ T_y \\ T_z \end{bmatrix}$$

For the two observation case:

$$\begin{bmatrix} 1 & -\hat{r}_1 \cdot \hat{r}_2 \\ -\hat{r}_1 \cdot \hat{r}_2 & 1 \end{bmatrix} \begin{bmatrix} \alpha_1 \\ \alpha_2 \end{bmatrix} = \begin{bmatrix} -\hat{r}_1 \cdot T \\ -\hat{r}_2 \cdot T \end{bmatrix}$$

In general, for n observations where the object is translated $T_n$ to each position, we can solve the least-square fitting using the following:

$$\begin{bmatrix} (n-1) & -\hat{r}_1 \cdot \hat{r}_2 & \cdots & -\hat{r}_1 \cdot \hat{r}_n \\ -\hat{r}_1 \cdot \hat{r}_2 & (n-1) & & -\hat{r}_2 \cdot \hat{r}_n \\ \vdots & & & \vdots \\ -\hat{r}_1 \cdot \hat{r}_n & -\hat{r}_2 \cdot \hat{r}_n & \cdots & (n-1) \end{bmatrix} \begin{bmatrix} \alpha_1 \\ \alpha_2 \\ \vdots \\ \alpha_n \end{bmatrix} = \begin{bmatrix} \hat{r}_1 \cdot (nT_1 - T_{sum}) \\ \hat{r}_2 \cdot (nT_2 - T_{sum}) \\ \vdots \\ \hat{r}_n \cdot (nT_n - T_{sum}) \end{bmatrix}$$

after recovering $\alpha_1 \rightarrow \alpha_n$, use $\vec{P} = \vec{C} + \alpha_i \hat{r}_i$ Recovery of Camera Position $\vec{C}$ with Respect to External Frame The solution technique is similar to that used in the stereo camera case, except that it is not possible to find the 3D positions of the target from only a single view. At each unique orientation of the target, one or more positions are viewed that retain the targets orientation, but translate it to a new position. The single camera 3D position measurement technique, is then used at each of the unique orientation sets to recover the target's 3D positions in the temporary coordinate frame. The calculations then continue as in the stereo case parts 3) and 4) to find the external coordinate frame.

Figure 4:
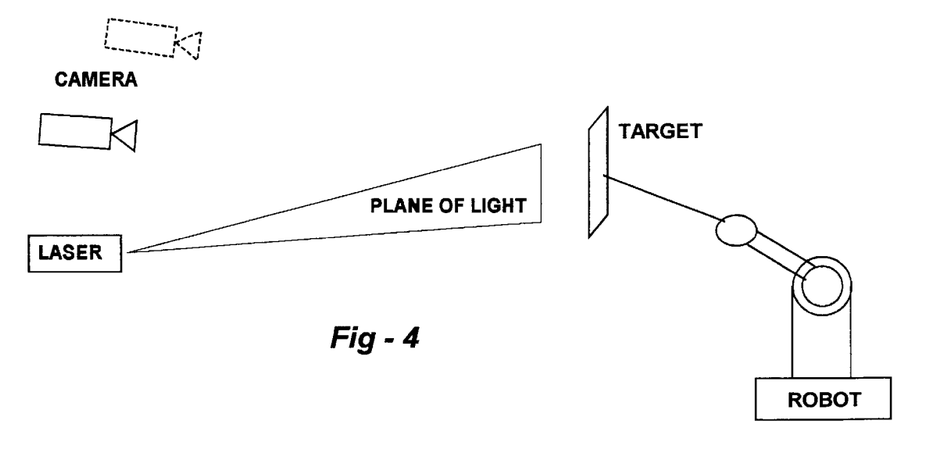
FIG. 4 is a simplified drawing used to depict laser calibration according to the invention, whether through single or stereo cameras.

Laser Calibration—(See FIG. 4)

1) Calibrate camera to robot as described earlier.

2) Move target to n positions such that the target is in the field of view and the laser strikes the target.

3a) For stereo concerns, find the 3D line of where the laser strikes the target using camera triangulation technique.

3b) For a single camera, find the plane description of the target at each of the offset positions. Three or more fiducials are used on the target, along with known relative translational moves to find the fiducials coordinates at each of the positions, or multi-fiducial camera calibration to find nominal positions of the fiducials.

Figure 5:
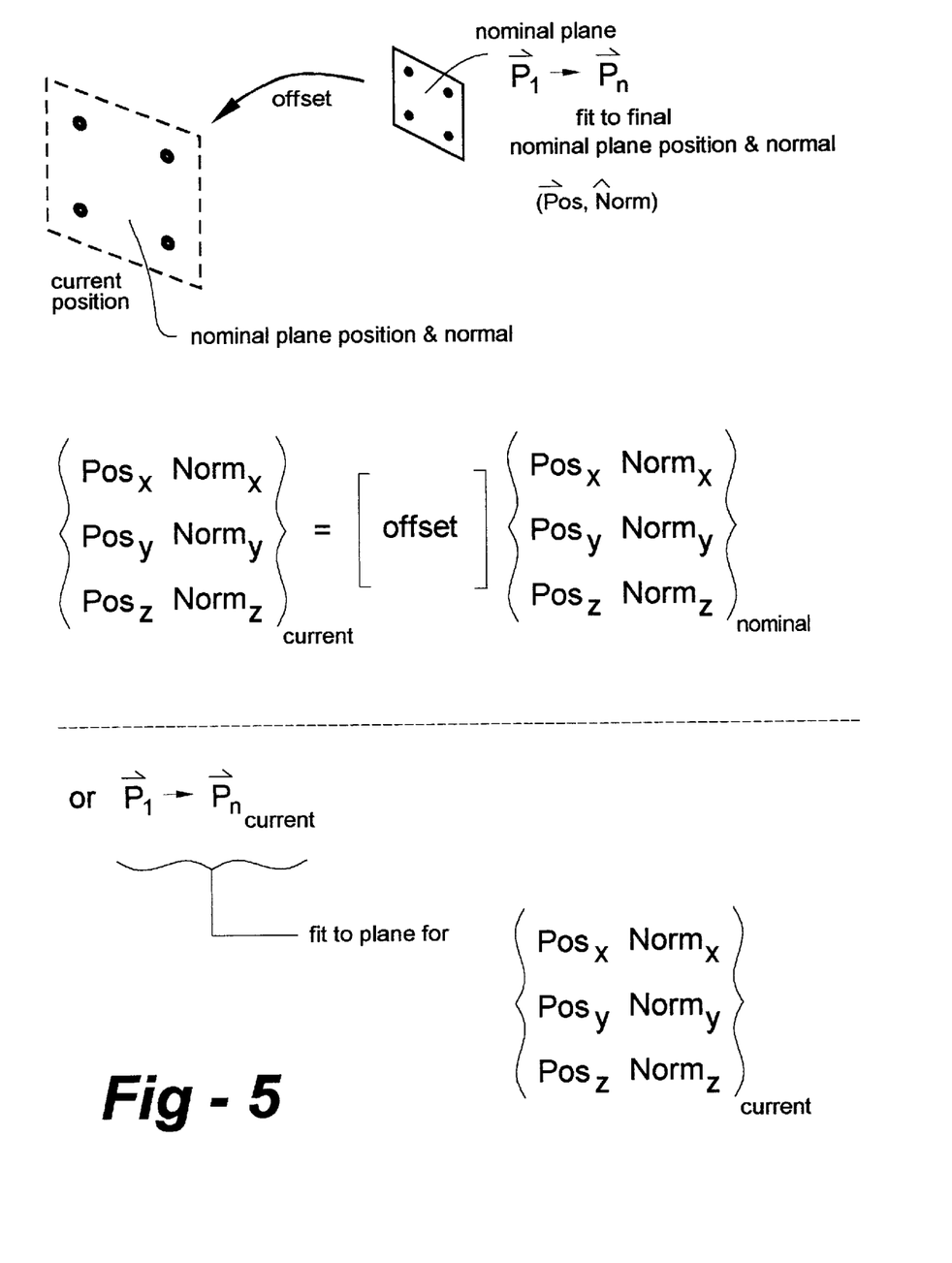
FIG. 5 is a drawing which shows how fiducials are used at laser observation positions to compute plane offsets according to the invention.

A plane is then fit to the known 3D positions of the fiducials at each of the laser observation positions, or the plane is computed by transforming the nominal plane position by the current offset, as shown in FIG. 5.

From the camera's calibration data and the image of the laser striking the target, the plane out of the camera which contains the laser/target intersection is computed. The intersection of the camera's imaged plane and the target plane yields the 3D line of where the laser strikes the target.

Figure 6:
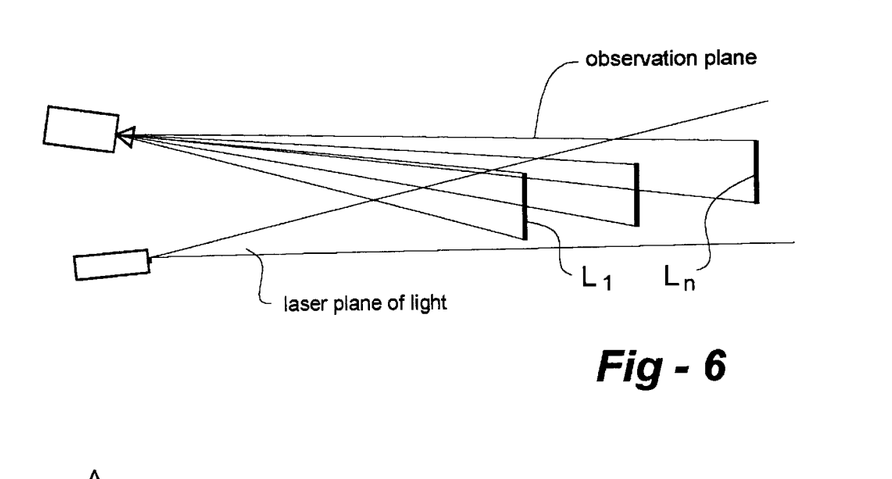
FIG. 6 is a drawing which shows how lines are fit to a plane to provide a description of structured light according to the invention.

4) Given that the preceding calculations have been done for n positions of the target, we have n 3D lines which exist in the plane of the laser light. The lines are then fit to a plane and that plane's position and normal is used as a description of the structural light, as shown in FIG. 6.

Figure 7:
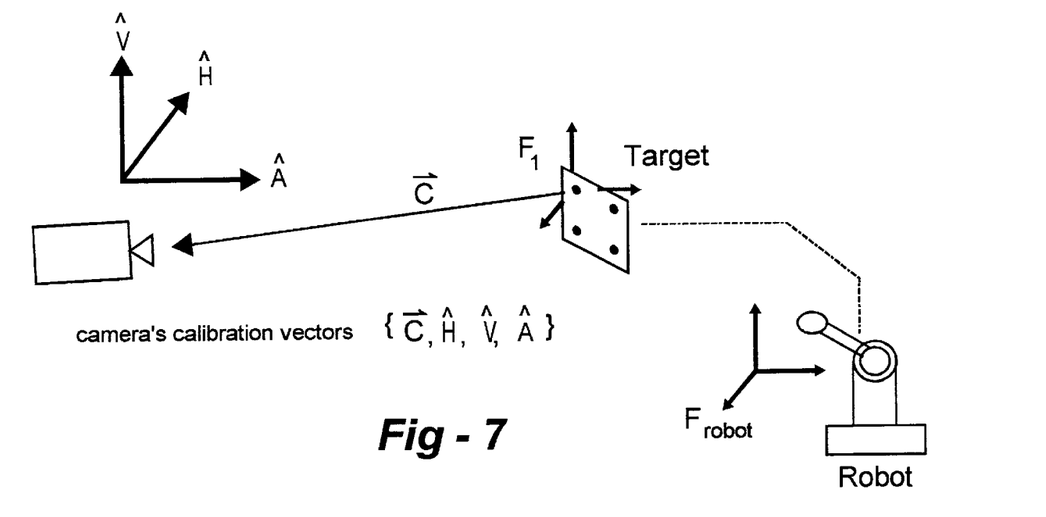
FIG. 7 is a schematic drawing used to illustrate a single camera calibration technique according to the invention.

Single Camera Calibration (See FIG. 7)

1) Robot moves to N positions using only translations (N≧6)

Compute calibration data with respect to $F_1$ $\{\vec{C}, \vec{H}, \vec{V}, \vec{A},\}F_1$ Compute fiducials with respect to $F_1$ $\{P_1 \rightarrow P_\alpha\}_{F1}$ ($\alpha \geq 3$)

2) Robot moves to M positions with orientation change (M≧3)

Compute $F_1$ with respect to Robot's frame

Update cal data $\{\vec{C}, \vec{H}, \vec{V}, \vec{A}\}F_{Robot}$

Update fiducial data $\{P_1 \rightarrow P_\alpha\}F_{Robot}$

Figure 8:
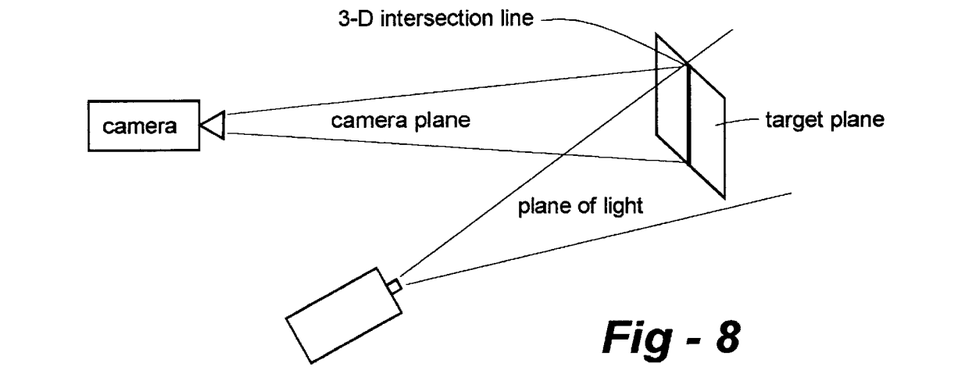
FIG. 8 is a schematic drawing used to illustrate laser calibration in conjunction with a camera and target plane.

Laser Calibration 3) Robot moves target such that laser hits target (N≧2), as shown in FIG. 8.

Compute target plane locations from plane fitting $\{P_1 \rightarrow P_\alpha\}_N$ or by offsetting the nominal plane by the known robot's offset.

$P_N = [\text{offset}]_N \{P\}^*$ $n_N = [\text{offset}]_N \{n\}^*$

Compute 3D plane through camera using the imaged line and calibration data.

Intersect camera plane and target plane 3D line of intersection

Camera Calibration

There are two phases to the camera calibration operation. The first one involves only translations of the target. The known displacements and view positions are used to solve for the camera's relative position, orientation and scaling factors.

Phase one has been previously done using a single target. The equations have been expanded to allow multiple targets. When multiple targets are used, their relative displacements are also recovered during this operation.

The second phase involves observing the same calibration target as the robot moves it through a series of rotations. The rotation orient is deduced and that information is used to translate the camera position to be with respect to the true frame origin.

Note that the target and camera positions are "locked" together in phase 1. The adjustments found during phase 2 can also be applied to the targets if their true position is desired.

Phase two has been previously done with stereo cameras. The equations required finding the relative 3D position of the target at each of its positions. There are two methods of solving this problem with only a single camera.

1) At each orientation, move to multiple positions. The known vector displacement between the moves and the partially calibrated camera allows solving for the 3D positions of the target.

2) Modify the equations to solve for the frame origin using only the projected image information.

All of these methods have been tested and evaluated. The final option of using only projections has proved to be superior even when applied in the stereo cases (using projection information from both cameras).

Structured Light Calibration

In the following we will be using a plane of light as an example, the same or similar methods can be used for other shapes.

It is assumed that the associated camera has gone through at least phase 1 of its calibration operation (some options require phase 2).

A known relationship is needed between the targets and the surface they are attached to. A planar surface is simplest but by no means necessary.

The 3D position and orientation of the target at intersection points with the light is used to extract multiple contour slices of the light beam.

The local contour samples are then fitted to find a global geometric description of the light. A sheet of light is represented as a 3D plane in space.

Figure 9:
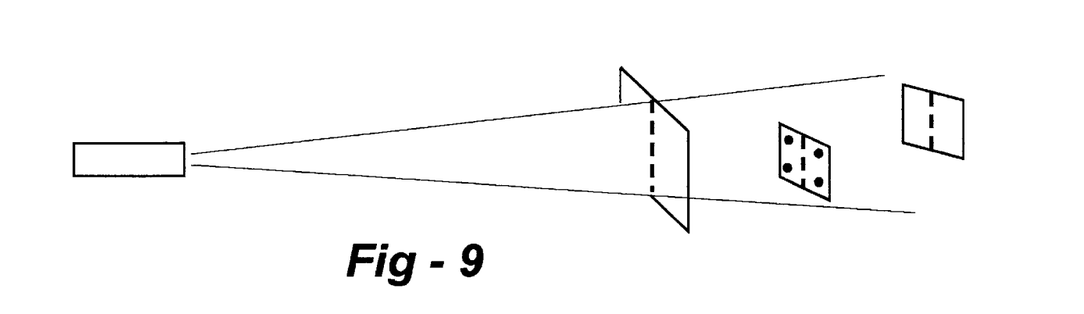
FIG. 9 illustrates an inventive technique whereby fiducials may be used in conjunction with the calibration of structured light.

If the target surface is a plane, as shown in FIG. 9, and the structural light is in the form of a sheet, then the intersection of these two planes will be a line. The coordinates of that line can be found by a single camera if the position and orientation of the target is known.

Finding Target Positions

1) If the camera has proceeded through phase 2, then the target positions are known (with respect to the robot's coordinate frame) at the first offset position. Using this information the "zero offset" position of the target can be calculated.

$$\begin{bmatrix} P_x \\ P_y \\ P_z \end{bmatrix}_m = [\text{offset}]_m \begin{bmatrix} P_x \\ P_y \\ P_z \end{bmatrix}_*$$

$P_m$ (position at offset "'"m)=$[\text{offset}]_m$ $p^*$,
$P^*$ (zero offset position)=$[\text{offset}]_m^{-1}$ $\{p\}_m$ The known offset sent to the robot (at any location), can now be used to calculate the current target position, and orientation.

2) A second method for finding the 3D target positions is to offset the robot from the intersection position while retaining the orientation of the target. This creates a known displacement between the two positions which a calibrated camera can be used to resolve the 3D coordinates at each position.

Both methods have been tested. The "better" label generally goes to method 1, but is influenced greatly by how errors are distributed within the robot's working envelope.

Frame Origin Computation Using Projection Into 1→n Cameras

From camera calibration equations:

$$\frac{(\vec{P}-\vec{C})\cdot\vec{H}}{(\vec{P}-\vec{C})\cdot\hat{A}} = i, \quad \frac{(\vec{P}-\vec{C})\cdot\vec{V}}{(\vec{P}-\vec{C})\cdot\hat{A}} = j$$

1) $(P-C)\cdot(\vec{H}-i\hat{A}) = 0$

2) $(P-C)\cdot(\vec{v}-j\hat{A}) = 0$ $\{P\}_n = [\text{offset}]_n\{P\}^*$ where $P^*$ is zero offset position 3) $[[\text{off}]_n\{P\}^* - [\vec{C}+[\text{off}]_1\{P\}^*]\cdot[\vec{H}-i\hat{A}] = 0$ 4) $[[\text{off}]_n\{P\}^* - [\vec{C}+[\text{off}]_1\{P\}^*]\cdot[\vec{V}-j\hat{A}] = 0$ There is one unknown here.

$P^*$ is the zero offset position of the target

Splitting out the translation portion of the offset matrix and using the notation $h=\vec{H}-iA$ and $v=\vec{V}-jA$ yields 5) $h_n^T\cdot[[R]_n - [R]_1]\{P\}^* = (\vec{C}+\vec{T}_1-\vec{T}_n)\cdot h_n$ 6) $v_n^T\cdot[[R]_n - [R]_1]\{P\}^* = (\vec{C}+\vec{T}_1-\vec{T}_n)\cdot v_n$ Using $[M]_n \equiv [R]_n - [R]_1$ $\vec{D}_n \equiv \vec{C}+\vec{T}_n-\vec{T}_1$ 7) $h_n^T\cdot[M]_n\{P\}^* = D_n\cdot h_n$ 8) $v_n^T\cdot[M]_n\{P\}^* = D_n\cdot v_n$ The above two equations are expanded over all cameras, all positions, to find the least squares best fitting vector $P^*$.

$P^*$ is the zero offset position of the target. The camera(s) position vector is corrected by the computed position of the target at the first offset position. $\vec{C}_{true}=\vec{C}+[\text{off}]_1\{P\}^*$ In concluding, it should be noted that although the description and drawings make reference to a "target," and although such a target is preferably provided in the form of a flat or curved surface having markings thereon, at least the camera calibration aspect of the invention will work through the observation of one or more portions of the robot itself, for example, distinctive physical features on the end effector, or elsewhere, so long as such features are discernable and movable by the robot in three space.

I claim:

1. In a work cell of the type containing one or more robots, each having a coordinate frame, and one or more video cameras, a method of calibrating at least one of the cameras, comprising the steps of:

equipping one of the robots with one or more fiducials movable in three space;

moving the robot and/or the camera relative to one another through a series of offsets while observing and recording the image of each fiducial using the camera to be calibrated; and determining the relationship between the relative position of the camera and the robot's coordinate frame using only fiducial observations as the robot is moved through the series of offsets.

2. The method of claim 1, wherein the camera to be calibrated remains stationary while the target is moved through the series of offsets.

3. The method of claim 1, wherein the camera is moved while the target remains stationary.

4. The method of claim 1, including the step of calibrating a plurality of cameras through a series of offsets between each camera and at least one target.

5. The method of claim 1, wherein the work cell contains at least one structured light source, and wherein the target includes a surface profile, the method further including the step of using the camera being calibrated as measuring a device to determine the position and form of the structured light based upon the surface profile.

6. The method of claim 1, wherein the step of equipping one of the robots with a plurality of fiducials movable in three space includes the step of providing the robot with a target including such fiducials in the form of surface features.

7. The method of claim 1, wherein the relationship between the robot's coordinate frame and at least one of the fiducials is known, such that the offset need only include a series of translations.

8. The method of claim 1, wherein the offsets include at least one rotation to determine the relationship between the robot's coordinate frame and at least one of the fiducials.

9. The method of claim 1, wherein the offsets include a series of translations.

10. The method of claim 1, wherein the offsets include a series of rotations.

11. The method of claim 1, wherein the offsets include moving a combination of translations and rotations.

12. A method of automatically calibrating a single camera having a field of view in work-cell environment including a robotic manipulator with an end effector, comprising the steps of:

providing a calibration target relative to the end effector having at least three distinct features that can be resolved in the camera's field of view;

moving the target in three space while remaining in the field of view of the camera by sending a series of offsets to the robot;

recording each offset position of the target in three space by observing the positions of the target features;

computing a first set of camera calibration data with respect to a temporary coordinate frame and the three-dimensional offset target positions;

aligning the temporary coordinate frame with the robot's frame;

displacing the target through a second set of offsets in three dimensions while keeping the target in the camera's field of view;

computing the positions of the features in three space;

determining the origin of the robot's frame in accordance with the recorded offsets and computed feature positions.

13. The method of claim 12, wherein the step of displacing the target through a second set of offsets in three dimensions includes performing at least one rotation in three space.

14. The method of claim 12, wherein the step of displacing the target through a second set of offsets in three dimensions includes the step of performing a series of translations.

15. The method of claim 12, wherein at least two distinct positions of the target are viewed by the camera for each of the target orientations.

16. The method of claim 12, wherein the work cell includes a structured light source, and wherein the method further includes a process for determining the shape of structured light, comprising the steps of:

moving the target over a set of positions such that the light striking the target is in the camera's field of view;

observing and recording the shape of the light striking the target surface at each position; and computing the shape of the light in three space in accordance with the recorded position and orientation data.

17. The method of claim 16, wherein the target surface is a planar surface.

18. The method of claim 16, wherein the target surface is non-planar.

19. The method of claim 18, wherein the structured light is a plane of light, enabling the camera to image a line in the vicinity of where the two planes intersect.

20. The method of claim 16, wherein the relationship between the end effector and the target is known, enabling offsets to be used in each target position in the set.

21. The method of claim 16, wherein the relationship between the end effector and the target is unknown, the method further including the step of performing a relative offset between the camera and the target at a fixed orientation to ascertain the target's position in space over the set of positions.

* * * * *